Dec. 10, 1968 W. E. ENGELHARD 3,416,064
LOW NOISE DC TO AC SIGNAL CONVERTER
Filed Jan. 5, 1967
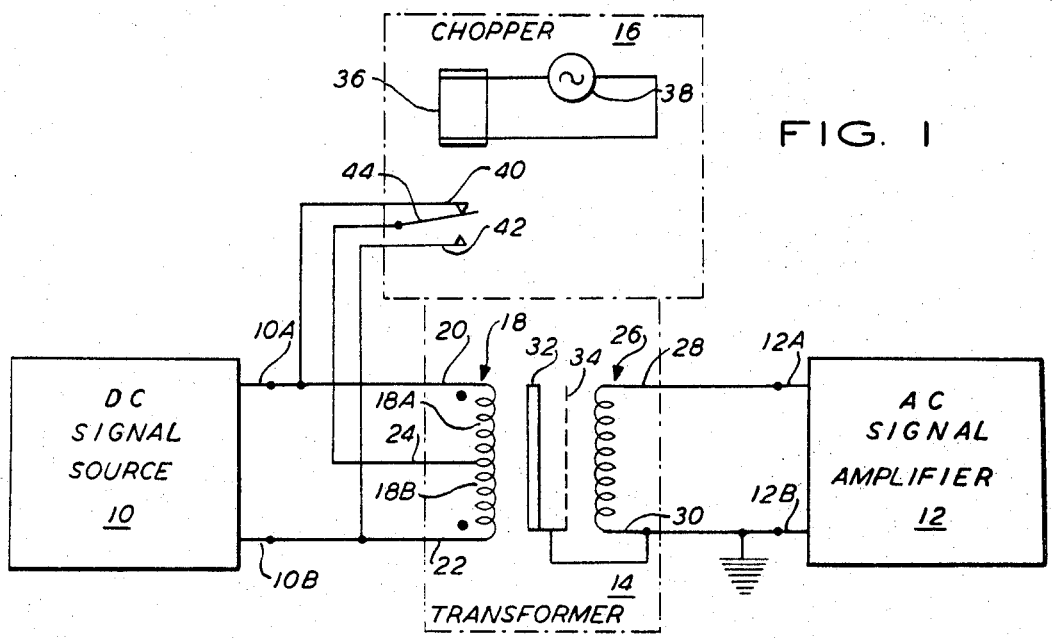
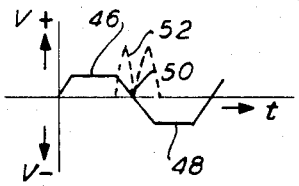
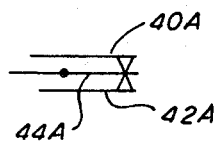
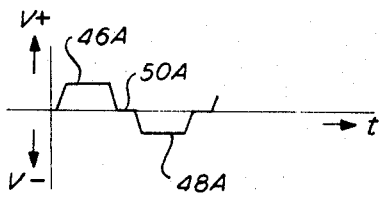
INVENTOR
W. E. ENGELHARD
BY
ATTORNEY

United States Patent Office 3,416,064
Patented Dec. 10, 1968

3,416,064
LOW NOISE DC TO AC SIGNAL CONVERTER
William E. Engelhard, Apalachin, N.Y., assignor to Pyro-Serv Instruments, Inc., North Arlington, N.J., a corporation of New Jersey
Filed Jan. 3, 1967, Ser. No. 606,966
2 Claims. (Cl. 321—49)

ABSTRACT OF THE DISCLOSURE

A DC to AC converter of the vibrator type wherein the DC supply is directly across the primary of a transformer and the vibrator reed is connected in between a mid tap on the transformer and contacts leading to opposite ends of the primary coil to alternately short circuit opposite halves of the coil.

---

This invention pertains to DC to AC signal converters and more particularly to such converters employing electromechanical choppers.

In order to amplify very low level DC signals, it has been found that ordinary electronic DC signal amplifiers are unsatisfactory because of drift and instability. While it is possible to stabilize such amplifiers and diminish their sensitivity to drift by means of complex feedback arrangements, the resulting DC signal amplifier is too expensive for many systems. In order to avoid the problem, systems are employed which obtain the desired amplification by first converting the DC signal to an AC signal having an amplitude proportional to the DC signal. The AC signal is then amplified by inexpensive high-gain electronic AC signal amplifiers. The suitably amplified AC signal may be used directly to operate an AC device or rectified to produce an amplified DC signal. Since AC signal amplifiers are very stable and very insensitive to drift the usual problems associated with DC signal amplifiers are not encountered.

However, such systems present new problems. The weak link in the systems is the DC to AC signal converter. The simplest type of converter is a "chopper" which has a moving contact that alternately makes with a terminal connected to the DC signal source and a terminal connected to a reference voltage source (usually ground) to produce a square wave signal having an amplitude proportional to (usually equal to) the amplitude of the DC signal. The moving contact is connected to the input of an AC signal amplifier. While the moving contact is between the terminals the input of the AC signal amplifier "sees" a very high (practically infinite impedance). Since the amplifier is designed to accept very low level signals a serious noise sensitivity problem is present. This noise will arise from the ever present thermal and contact electromotive forces or from stray noise pickup.

It is a general object of the invention to provide an improved DC to AC signal converter.

It is another object of the invention to provide an improved DC to AC signal converter utilizing a chopper which is very insensitive to noise.

It is a further object of the invention to satisfy the above objects with apparatus which is simple and inexpensive.

Briefly, the invention contemplates a DC to AC signal converter comprising an input transformer and a chopper. The input transformer has a primary winding including first and second outer legs and a centertap. The outer legs are connected to the DC signal source so that the DC signal is developed across the outer legs. The transformer has a secondary winding with at least two output legs for transmitting an AC signal. The chopper includes first and second contacts and a vibratable contact. The vibratable contact alternately contacts the first and second contacts. The first contact is connected to the first outer leg of the primary winding; the second contact is connected to the second outer leg of the primary winding; and the vibratable contact is connected to the centertap of the primary winding.

Features of the invention are concerned with the phasing of the portions of the transformer primary winding and the chopper contact configuration to further enhance the noise immunity of the converter. Other objects, the features and advantages of the invention will be apparent from the following detailed description when read with the accompanying drawing which shows, by way of example and not limitation, the now preferred embodiment of the invention.

In the drawing:

FIGURE 1 shows schematically a system for converting a DC signal to an amplified AC signal utilizing a chopper and a transformer in accordance with the teaching of the invention;

FIGURE 2 is a waveform diagram of the output signal of the transformer of FIGURE 1;

FIGURE 3 shows a make before break contact configuration for the chopper of FIGURE 1; and FIGURE 4 is a waveform diagram of the output signal of the transformer of FIGURE 1 when the contact configuration of FIGURE 3 is employed.

Referring now to FIGURE 1, there is shown a system for converting a DC signal to an amplified AC signal comprising a DC signal source 10 which feeds an AC signal amplifier 12 via a transformer 14 under the control of chopper 16.

The DC signal source 10 supplies the DC signal to be converted across its output terminals 10A and 10B. The AC signal amplifier 12 receives an AC signal to be amplified across its input terminals 12A and 12B.

Transformer 14 comprises a centertapped primary winding 18 having a first outer leg 20, a second outer leg 22 and a centertap 24; a secondary winding 26 having first and second output legs 28 and 30; a ferromagnetic core 32; and a Faraday shield 34. The portion of the primary winding 18A between leg 20 and centertap 24 is wound in phase opposition to the portion of the primary winding between centertap 24 and leg 22. Although a centertapped primary winding is shown and described it should be apparent that two primary windings can be used, one winding being equivalent to portion 18A and the other equivalent to portion 18B of primary winding 18.

Outer leg 20 is connected to output terminal 10A. Outer leg 22 is connected to output terminal 10B. Output leg 28 is connected to input terminal 12A and output leg 30 is connected to input terminal 12B.

Chopper 16 comprises a solenoid coil 36 driven by an alternating current source 38; first and second contacts 40 and 42; and a vibratable contact 44. Under the influence of solenoid 36 vibratable contact 44 is alternately connected to contacts 40 and 42. Contact 44 can be a reed having a resonant frequency equal to the frequency of source 38. It should be noted that the contact configuration is the break before make type.

In operation, when contact 44 is against contact 42, the positive voltage lobe 46 (FIGURE 2) is transmitted by secondary winding 26. When contact 44 is against contact 40 the negative lobe 48 is transmitted. Ideally, a square wave would be transmitted. However, the transformer inductance rounds off the leading and trailing edges i.e., removes or filters out some of the high frequency components. Note should be taken of the fact that the waveform of FIGURE 2 is obtained when the portions 18A and 18B are closely matched. But changes due to wear or shifting contacts 40, 42 and 44 with use are no longer as critical.

It should be noted that at all times except for the transitions at least a portion of the primary winding is short circuited. During the transitions such as 50 (FIGURE 2), if noise is present, as indicated by dotted waveform 52 the phase opposition of the portions of the primary winding 18A "bucks out" the noise and it never reaches the secondary winding 26.

In order to insure that at least one of the portions of the primary windings is always shorted a make before break contact configuration as shown in FIGURE 3 can be employed. Contacts 40A, 42A and 44A should be reedlike. In the mutual or center position, contact 44A is connected to contacts 40A and 42A. When contact 44A is pulled down as viewed in the drawing, it remains in contact with contact 42A but breaks away from contact 40A and the voltage lobe 46A (FIGURE 4) is transmitted. When contact 44A is pulled up it remains in contact with contact 40A but breaks away from contact 42A and voltage lobe 48A is transmitted. During the transition contact 44A is in contact with both of the contacts 40A and 42A and no output voltage is transmitted as shown by portion 50A of the waveform. The waveform of FIGURE 4 resulting from the make before break contacts of FIGURE 3 is quite similar to the waveforms of FIGURE 2 resulting from the break before make contacts of FIGURE 1 except that the make before break configuration insures a zero voltage during the overlap period. This zero voltage condition is indicated by the exaggerated portion 50A of the wave form of FIGURE 4.

There will now be obvious to those skilled in the art many modifications and variations satisfying any, or all, of the objects of the invention but which do not depart from the spirit thereof, as defined in the appended claims.

What is claimed is:

1. A DC to AC signal converter comprising an input transformer having a primary winding and a secondary winding, said primary winding including first and second outer legs adapted to receive a DC input signal and a centertap, said secondary winding including first and second output legs for transmitting an AC signal, a chopper comprising first and second contacts and a vibratable contact for alternately contacting said first and second contacts, means for connecting said first contact to said first outer leg, means for connecting said second contact to said second outer leg and means for connecting said vibratable contact to said centertap, the portion of the primary winding between the first outer leg and the centertap being wound in phase opposition configuration to the portion of the primary winding between the centertap and the second outer leg, the contacts of said chopper being arranged so that said vibratable contact breaks with the second contact before making contact with the first contact.

2. The converter of claim 1, wherein said chopper is adapted to be connected to an alternating source of potential having a preselected frequency, and said vibratable contact comprises a reed having a resonant frequency equal to said preselected frequency.

References Cited

UNITED STATES PATENTS

| | | | |
|---|---|---|---|
| 2,998,562 | 8/1961 | Petzelt | 321—48 |
| 3,192,450 | 6/1965 | Reifel | 317—155.5 |

LEE T. HIX, *Primary Examiner.*

G. GOLDBERG, *Assistant Examiner.*